(12) United States Patent
Stewart et al.

(10) Patent No.: US 8,879,137 B2
(45) Date of Patent: Nov. 4, 2014

(54) ULTRAFAST TRANSIENT GRATING RADIATION TO OPTICAL IMAGE CONVERTER

(75) Inventors: Richard E. Stewart, San Ramon, CA (US); Stephen P. Vernon, Pleasanton, CA (US); Paul T. Steel, Livermore, CA (US); Mark E. Lowry, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 429 days.

(21) Appl. No.: 13/423,498

(22) Filed: Mar. 19, 2012

(65) Prior Publication Data
US 2012/0250133 A1 Oct. 4, 2012

Related U.S. Application Data

(60) Provisional application No. 61/470,331, filed on Mar. 31, 2011.

(51) Int. Cl.
| | |
|---|---|
| *G02B 26/00* | (2006.01) |
| *G02F 1/03* | (2006.01) |
| *G02F 1/29* | (2006.01) |
| *G02F 1/015* | (2006.01) |
| *H04B 10/50* | (2013.01) |
| *G21K 4/00* | (2006.01) |

(52) U.S. Cl.
CPC .............. *G02F 1/293* (2013.01); *G02F 1/015* (2013.01); *H04B 10/505* (2013.01); *G02B 26/001* (2013.01); *G21K 2201/06* (2013.01); *G21K 4/00* (2013.01); *G02F 2201/30* (2013.01); *G02F 2202/10* (2013.01); *G02F 2202/13* (2013.01)
USPC ............ 359/238; 359/260; 359/261; 359/290

(58) Field of Classification Search
CPC .. G02B 26/001; G02B 26/0841; G02B 10/15; G02B 6/2766; G02B 27/283
USPC ......... 359/238, 290–292, 295, 223–225, 245, 359/260–263, 298, 198, 301–303, 317–318, 359/237, 242
See application file for complete search history.

(56) References Cited

U.S. PATENT DOCUMENTS

| | | |
|---|---|---|
| 4,873,439 A | 10/1989 | Hagelstein |
| 6,876,723 B1 | 4/2005 | Celliers |

(Continued)

OTHER PUBLICATIONS

Derenzo, S.E., et al., Measurements of the Intrinsic Rise Times of Common Inorganic Scintillators, IEEE Trans. Nucl. Sci., NS-47, 2000, pp. 860-864.

(Continued)

*Primary Examiner* — Dawayne A Pinkney
(74) *Attorney, Agent, or Firm* — John P. Wooldridge

(57) ABSTRACT

A high sensitivity transient grating ultrafast radiation to optical image converter is based on a fixed transmission grating adjacent to a semiconductor substrate. X-rays or optical radiation passing through the fixed transmission grating is thereby modulated and produces a small periodic variation of refractive index or transient grating in the semiconductor through carrier induced refractive index shifts. An optical or infrared probe beam tuned just below the semiconductor band gap is reflected off a high reflectivity mirror on the semiconductor so that it double passes therethrough and interacts with the radiation induced phase grating therein. A small portion of the optical beam is diffracted out of the probe beam by the radiation induced transient grating to become the converted signal that is imaged onto a detector.

32 Claims, 6 Drawing Sheets

(56) References Cited

U.S. PATENT DOCUMENTS

2004/0130728 A1* 7/2004 Degertekin et al. ............ 356/505
2005/0052729 A1* 3/2005 Mitamura et al. ....... 359/337.21

OTHER PUBLICATIONS

Eldering, C.A., et al., "Etalon time response limitations as calculated from frequency analysis," Optical Engineering, vol. 32, No. 3, 1993, pp. 464-468.

Eugster, C.C., et al., "X-Ray Detection Using the Quantum Well Exciton Nonlinearity," IEEE Journal of Quantum Electronics, vol. 26, No. 1, 1990, pp. 75-84.

Gahl, C., et al., "A femtosecond X-ray/optical cross-correlator," Nature Photonics 2, 2008, pp. 1-16.

Gourley, P.L., et al., "Optical scatter in epitaxial semiconductor multilayers," Appl. Phys. Lett. 58, No. 13, 1991, pp. 1360-1362.

Jeannes, F., et al., "Nonlinear optical and bistable properties of a wafer-fused vertical-cavity device based on InGaAsP," Optics Communications 134, 1997, pp. 607-614.

Lambsdorff, M., et al., "Subpicosecond carrier lifetimes in radiation-damaged GaAs," Appl. Phys. Lett. 58, 1881, 1991, pp. 1881-1883.

Lee, Y.H., et al., "Room-Temperature Optical Nonlinearlities in GaAs," Phys. Rev. Lett., vol. 57, No. 19, 1986, pp. 2446-2449.

Lowry, M.E., et al., RadSensor: Xray Detection by Direct Modulation of an Optical Probe Beam, Proc. of SPIE, vol. 5194, 2004, pp. 193-204.

Lowry, M., et al., Xray detection by direct modulation of an optical probe beam-Radsensor: Progress on development for imaging applications, Rev. of Sci. Instr., vol. 75, No. 10., 2004, pp. 3995-3997.

Miller, D.A.B., et al., "Band-Gap-Resonant Nonlinear Refraction in III-V Semiconductors," Phys. Rev. Lett. 47, No. 3, 1981, pp. 197-200.

Said, A.A., et al., "Determination of bound-electronic and free-carrier nonlinearities in ZnSe, GaAs, CdTe, and ZnTe," J. Opt. Soc. Am. B, vol. 9, No. 3, 1992, pp. 405-414.

* cited by examiner

ULTRAFAST TRANSIENT GRATING RADIATION TO OPTICAL IMAGE CONVERTER

CROSS-REFERENCE TO RELATED APPLICATIONS

This application claims the benefit of U.S. Provisional Patent Application No. 61/470,331 titled "Ultrafast Transient Grating Radiation to Optical Image Converter" filed Mar. 31, 2011, incorporated by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The invention relates generally to radiation to optical image converters, and more particularly to ultrafast high sensitivity converters without scintillators or phosphors.

2. Description of the Prior Art

Research with short pulse high power lasers, inertial confinement fusion (icf), and free electron x-ray lasers has created a need for x-ray to optical converters and optical wavelength image converters with ps or sub ps time resolution, imaging capability, and high sensitivity. These converters can be used as the basis of framing cameras gated with short pulse laser beams, as the input for high-speed optical streak cameras, or as a means to record temporal variations of the x-ray or optical flux with chirped frequency coherent probe beams. In experiments that generate large pulsed neutron or gamma ray fluxes, such as icf research, the damaging effects of neutron and gamma induced backgrounds make the operation of conventional electro-optical detectors difficult or impossible around the area of the experiment. In these cases, high bandwidth conversion of detected signals into coherent optical beams allows for the transport of the optical signal to remote protected detectors where they can be safely recorded.

Currently time resolved x-ray to optical conversion or optical wavelength conversion is commonly performed using scintillators or phosphors, which produce UV or visible incoherent light. The fastest time response demonstrated with these materials is a sub 25 ps rise time and 160 ps decay time in ZnO:Ga phosphors and crystals. These materials also have limited x-ray stopping power, low optical output power, and broad angular output.

Work has been done attempting to use carrier induced refractive index changes in semiconductors to modulate probe beams in quantum wells and bulk semiconductors through high angle scattering, interferometric effects in Fabry Perot etalon structures, or surface reflectivity modulation. Scattering at large angles caused by individual x-ray photons is typically weaker than the surface scattering from even the best polished surfaces at low intensities, and theoretically vanishes at higher intensities because the x-ray induced refractive index variation becomes spatially uniform. Probe beam intensity can be modulated in amplitude with uniform irradiation in Fabry Perot etalon structures, but they must be operated with small throughput to get good signal contrast and sensitivity. Lack of parallelism and scattering in the thick etalons needed for good x-ray absorption and sensitivity limits the contrast and sensitivity achievable in practice. Etalon time response for picosecond pulsed optical probes degrades as the finesse and thickness of the etalon increase, and etalons lose sensitivity as the line width of the probe laser approaches a fraction of the width of the resonance. High finesse etalons are extremely sensitive to variations in etalon thickness much smaller than the wavelength of the probe light, which makes accurate image conversion difficult. Reflectivity modulation has low sensitivity because the reflectivity changes very little and very slowly as a function of absorbed radiation flux, and the probe samples the semiconductor material only within an optical skin depth of the surface.

It is desirable to provide a radiation to optical converter for optically recording x-ray or optical signals with continuous and gated picosecond time resolution, high sensitivity, and good signal contrast.

SUMMARY OF THE INVENTION

X-ray or optical radiation from an external source strikes a fixed grating or mask or grid formed of spaced thin bars. The transmitted radiation pattern is incident on a specially treated semiconductor where it is absorbed, modifying the optical properties of the semiconductor in proportion to the illumination intensity. The fixed grating or mask or grid is positioned along a back surface of the semiconductor. A probe laser beam is incident on a front surface of the semiconductor, passes through the semiconductor, and is reflected back on itself off the back surface (which has a mirror thereon), thus passing through the optically modified semiconductor twice, diffracting a portion of the beam away from its original path by interaction with the transient refractive index grating produced in the semiconductor by the modulated radiation from the external source. The diffracted portion of the beam is relayed by a lens system and focused to form an image, which may be captured by a detector.

An aspect of the invention is a radiation to optical converter, including a semiconductor substrate having first and second opposed surfaces; a first mirror formed on the first surface of the semiconductor substrate; a fixed transmission grating positioned adjacent to the first mirror formed on the first surface of the semiconductor substrate; and a probe beam source positioned to provide a probe beam that is incident on the second surface of the semiconductor substrate, passes through the semiconductor substrate, and is reflected back therethrough by the first mirror; wherein radiation from an external source passing through the fixed transmission grating is thereby modulated, the modulated radiation passing through the first mirror into the semiconductor substrate and producing a transient radiation induced grating therein; wherein a portion of the probe beam passing through the semiconductor substrate is diffracted out of the probe beam by the transient grating. The semiconductor substrate may be formed of a direct band gap semiconductor, particularly a proton or neutron or ion damaged direct band gap semiconductor. The probe beam source may be an optical or infrared source, such as an optical laser. A reference optical grating, either an etched surface relief grating, an ion implanted grating, or a metallic phase shifting grating, with the same spatial frequency and phase as the fixed transmission grating, may be formed on the first surface of the semiconductor substrate. A partly transmissive and partly reflective second mirror may be formed on the second surface of the semiconductor substrate to form a Gires-Tournois etalon.

Another aspect of the invention is a radiation to optical converter apparatus, including a radiation to optical converter as above; external source imaging optics positioned to direct radiation from the external source onto the fixed transmission grating of the converter; diffracted beam imaging optics positioned to direct the diffracted probe beam to an imaging plane; and an image detector positioned at the imaging plane.

A further aspect of the invention is a method of converting radiation from an external source to optical radiation, by directing radiation from the external source onto a fixed transmission grating to modulate the radiation; passing the modulated radiation into a semiconductor substrate to produce a transient induced grating therein; directing a probe beam into the semiconductor substrate so that it travels twice through the semiconductor substrate and interacts with the transient grating to diffract a portion of the probe beam; and imaging diffracted portions of the probe beam.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
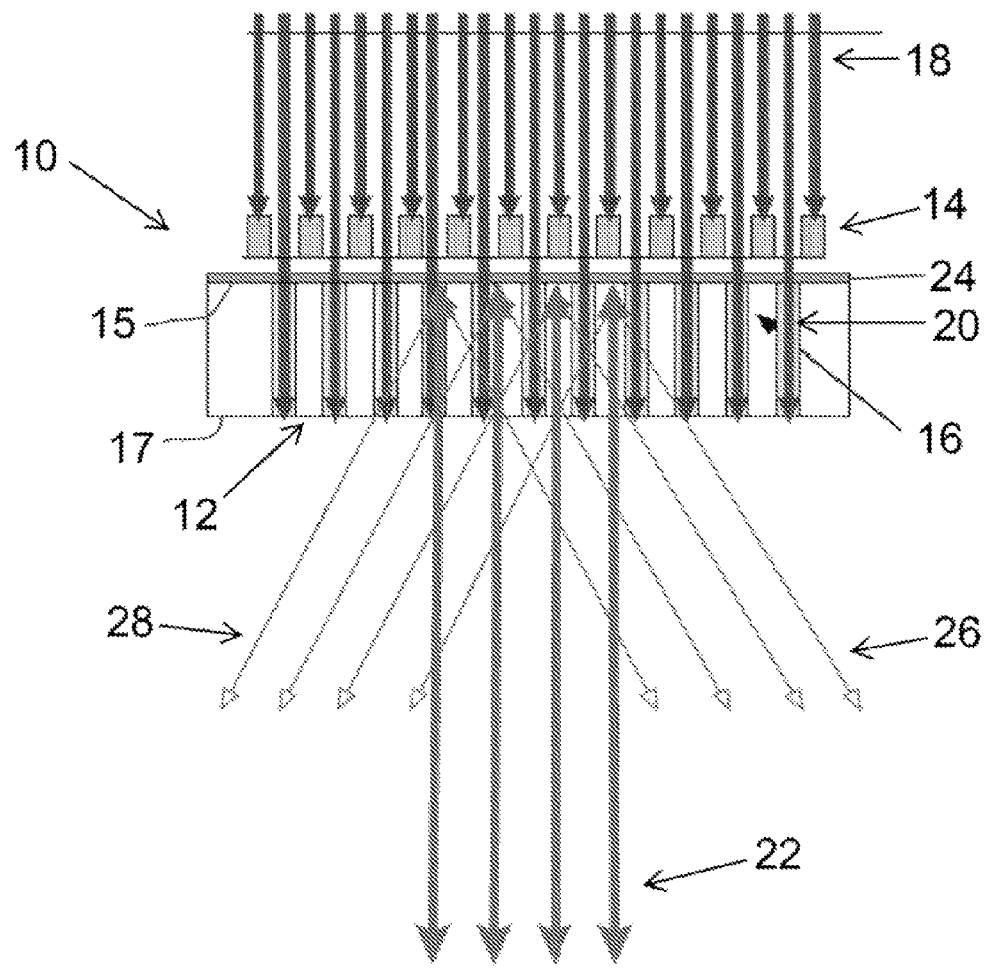
FIG. 1 is a cross-sectional view of a basic converter of the invention, using transient grating diffraction from a spatially modulated x-ray beam in a semiconductor wafer.

Referring more specifically to the drawings, for illustrative purposes the present invention is embodied in the apparatus and method generally shown in FIG. 1 through FIG. 4. It will be appreciated that the apparatus may vary as to configuration and as to details of the parts, and the method may vary as to its particular implementation and as to specific steps and sequence, without departing from the basic concepts as disclosed herein.

The diagnostic system and method of this invention uses transient diffraction of a coherent optical probe beam from the small index shifts created by spatially modulated x-ray or optical absorption in semiconductors to improve the time response of radiation to optical conversion to 1 ps or less. The brightness of the optically converted signal beam can be far higher than passive scintillators with superior time resolution. The ability to perform this fast x-ray to optical conversion can be used as the basis for a variety of sensitive ultrafast, x-ray and optical detectors on pulsed fusion experiments and ultra short pulse high intensity laser experiments.

When x-rays or optical photons more energetic than the band gap of a semiconductor are absorbed in a direct band gap semiconductor, they produce primary and secondary photoelectrons, which slow down and thermalize on a picosecond time scale, and cause a small shift in the dielectric function and refractive index of the semiconductor. The primary effect on the refractive index is a reduction of absorption at optical wavelengths close to the band edge of the material due to band filling, exciton screening, and band gap renormalization in the semiconductor. This refractive index shift produces a small change of phase of an optical probe beam passing through the region where x-rays are absorbed for all wavelengths in the vicinity of the band edge. The rise time for this shift with optical excitation can be of the order of 100 fs. The phase shift is difficult to detect because of its very small size. In the converter of the invention, radiation absorbed in the semiconductor produces a refractive index phase grating that diffracts a significant portion of an optical probe beam into discrete angles distinct from the incident direction of the beam. This is accomplished by passing a spatially uniform radiation flux or the flux from an x-ray or optical imaging system through a fixed high spatial frequency absorbing mask or grid or grating before it is absorbed in a thin semiconductor slab or wafer.

The mask has a linear grating pattern with a spatial frequency of about 30-100 lines/mm. The details of the absorption profile in the grating can vary, but a simple square profile is adequate. An x-ray mask can be fabricated from a high atomic number material like gold using x-ray lithography, femtosecond laser micromachining, or other techniques. Optical masks can be produced lithographically. The spatially modulated x-ray or optical beam is absorbed in the semiconductor, creating the desired spatially varying optical index as a thin volume grating for x-rays, or a surface grating for optical wavelengths. In reflection geometry, a collimated optical probe beam tuned near the band edge of the semiconductor and reflected off its back surface passes twice through the modulated index region, leading to diffraction of the probe beam away from its original path.

Light is diffracted at or near discrete angles determined by the period of the fixed grating, the wavelength of the probe beam, and the standard grating equation. This is shown schematically in FIG. 1 for the case of x-ray excitation. While FIG. 1 is shown for x-ray excitation, the operation of the converter is the same for optical excitation with photon energy greater than the bandgap energy of the semiconductor with the x-ray absorption grid replaced by a similar optical absorption grid. X-ray absorption grids must be thicker than optical absorption grids and use high density materials like gold to achieve adequate absorption of the x-ray excitation beam. The thickness of the absorption grid is adjusted to achieve sufficient absorption of the x-rays being imaged. For example, for 20 keV x-rays a 16 micron thick gold grid structure is needed to block 90% of the incoming light in the absorbing part of the grid. Optical grids only need to be opaque to the excitation light, and are typically only one tenth of a micron thick. The linewidth and spacing of the grids is determined only by the wavelength of the probe beam, and is the same for both x-ray and optical excitation.

As shown in FIG. 1, an x-ray to optical converter 10 of the invention is formed of a semiconductor wafer or substrate 12 having a pair of flat opposed surfaces 15, 17. An x-ray absorption grid or mask or fixed grating 14 is positioned along or adjacent to (back) surface 15 of wafer 12 (in contact with or slightly separated therefrom). An x-ray induced free carrier index grating 16 is produced in wafer 12 when an x-ray beam (flux) 18 is incident on grid 14. Part of x-ray beam 18 passes through the spaces in grid 14 and part is blocked (absorbed) by the solid parts of grid 14, thereby spatially modulating the beam 18. The spatially modulated beam 20 that passes into wafer 12 after passing through grid 14 creates a transient diffraction grating 16 therein. This carrier index grating is written (produced) very quickly, e.g., in 100 fs. An optical probe beam 22 is directed at wafer 12 from the opposed (front) surface 17 to that (surface 15) adjacent to the grid 14 during the time the grating 16 is formed. The transient grating is formed for a short time. The probe beam could be on before the transient grating is formed; it could even be CW. The probe beam could also be applied just as the transient grating is formed or sometime during the existence of the transient grating. The probe beam is diffracted only when the transient grating exists. A thin (dielectric) mirror 24 on the surface 15 of the wafer 12 adjacent to grid 14 reflects optical beam 22 back on itself through the wafer (but transmits modulated x-ray beam 20) so that beam 22 passes through wafer 12 twice. Optical probe beam 22 is diffracted by grating 16. Along with the undiffracted zero order beam, only the in =+/−1 diffraction orders, $1^{st}$ order diffracted beam 26 and $-1^{st}$ order diffracted beam 28, are shown but higher order diffracted beams are also produced. For small amplitude transient phase gratings, the higher orders are much weaker than the first order diffracted beams.

Figure 2:
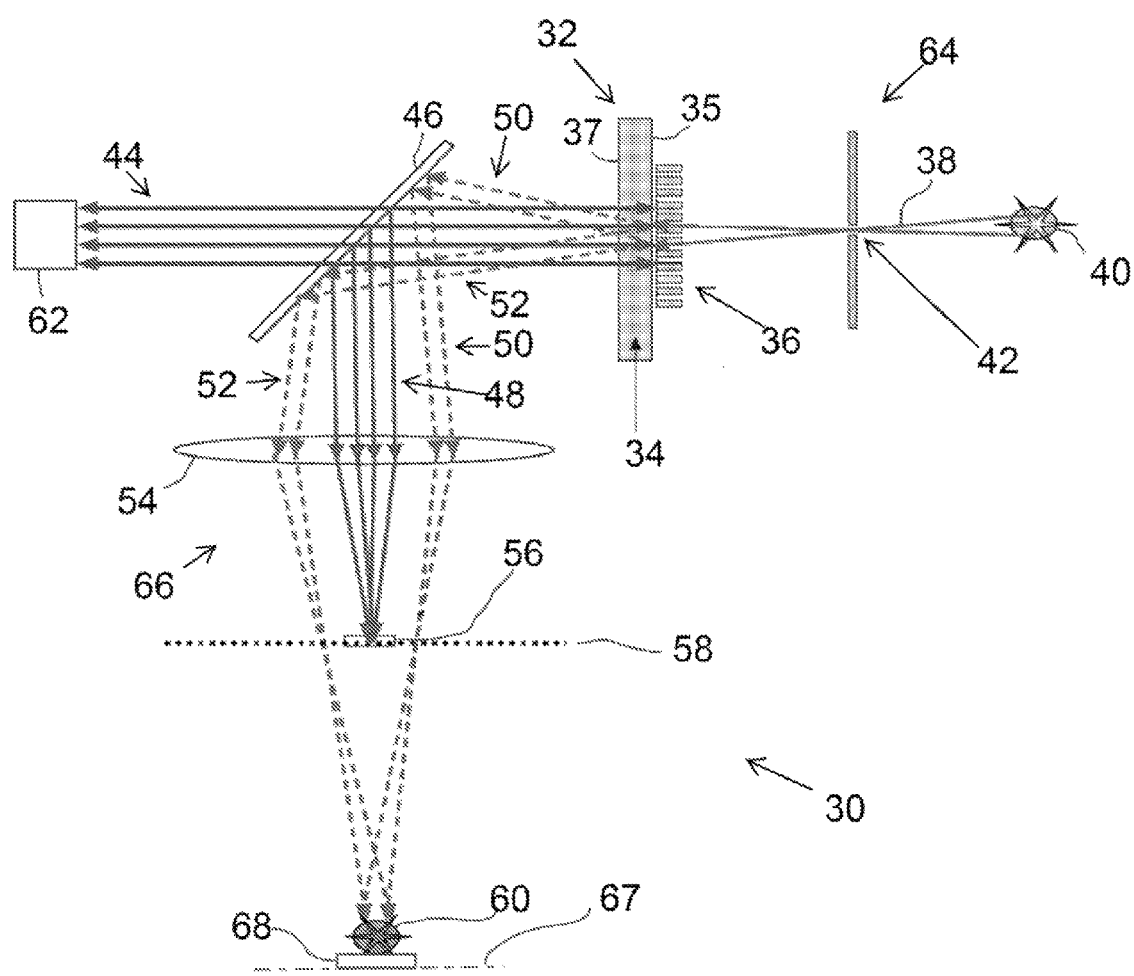
FIG. 2 is a cross-sectional view of a transient grating x-ray to optical imaging system of the invention.

The diffracted probe beam can be separated from the undiffracted 0 order beam and imaged relatively easily with a simple lens system, as shown in FIG. 2. In the figure, a simple x-ray pinhole camera is shown forming an x-ray image incident on the x-ray grating that is converted into an optical image.

As shown in FIG. 2 for the case of x-ray excitation, a transient grating x-ray to optical imaging system 30 of the invention has an x-ray to optical converter 32 formed of a semiconductor wafer 34, e.g. a GaAs wafer, having an x-ray grid or mask or fixed grating 36 adjacent to surface 35 thereof. Converter 32 is similar to converter 10 shown in FIG. 1 and has a mirror (not shown) on surface 35 as previously described. An x-ray beam 38 from an external x-ray source 40 passes through external source imaging optics (imaging system) 64, e.g. an x-ray pinhole (camera) 42, and is incident onto x-ray grid 36. The modulated x-ray beam produced by grid 36 produces a transient gradient (grating) in wafer 34 as described above. An optical probe beam 44 from probe beam source 62 passes through a beam splitter mirror 46, that is tilted at 45°, and is incident on wafer 34 on the opposed surface 37 from grid 36. As described above, optical beam 44 passes through wafer 34 and is reflected back on itself by the mirror (not shown) formed on the surface 35 of wafer 34. While beam 44 is traversing wafer 34, it interacts with the transient grating (not shown) formed therein, producing an undiffracted zero order beam 48 and diffracted beams 50, 52 (only m=+/−1 order beams shown) which are reflected by beam splitter mirror 46 toward a focusing lens 54. Mirror 46 and lens 54 more generally form diffracted beam imaging optics or image collecting or relay system 66. Lens 54 focuses 0 order beam 48 onto a 0 order block 56 located at the Fourier Transform plane 58. The diffracted beams 50, 52 focused by lens 54 bypass block 56 and form an optical image 60 beyond plane 58, typically on a detector 68, such as a CCD or film plate or other image capture or recording device, located at image plane 67. More than one lens may be used in place of a single lens 54.

As is well known from Fourier optics, the spatial Fourier transform of the probe beam is formed at the focal plane of the lens, so the undiffracted 0 order probe beam is focused there and can be blocked easily while allowing the much higher spatial frequency of the modulated x-ray beam to pass through to the image plane. Any low spatial frequency parts of the x-ray beam, such as might be produced by an x-ray imaging system, are effectively shifted to higher spatial frequencies by the grating modulation, and are also passed and imaged. The spatial resolution of the optical image is slightly degraded by the grating modulation in the direction of the grating, but is limited only by optical aberrations and the range of the primary photoelectrons and Auger electrons in the semiconductor in the other direction. This could be as small as 1-5 microns for 10 keV photons, increasing in size as the x-ray energy increases.

The system works similarly for optical images, where an external optical source replaces the external x-ray source 40, the source imaging system 64 is formed of a lens imaging system that replaces the pinhole camera 42, and an optical grid or mask or grating replaces x-ray grid or mask or grating 36. The modulated optical beam from the external source passing through the mask or grid similarly creates a transient gradient within the semiconductor wafer. The optical probe beam passes through the semiconductor substrate twice by reflection off the distal surface, and interacts with the transient grating to form a diffracted beam, which is imaged. In the optical case, the image resolution is limited by the optical aberrations of the imaging system.

The converter shown in FIG. 1 does not have any reference grating for heterodyne enhanced detection or etalon structure. The only background diffraction is due to scattering, similar to dark field optical imaging. The operation of the converter in this dark field mode will first be described, and then how to enhance the diffracted signal with a reference grating built into the converter and etalon structure.

Absorption of above bandgap light in the semiconductor typically has an absorption length of one or two microns. For 1 keV to approximately 30 keV x-rays, a significant fraction of the incident x-ray flux can be absorbed in a relatively thin 10-200 micron semiconductor, depending on the material chosen. Diffraction from this thin volume grating can be approximated by the diffraction pattern from a thin phase grating if it is in the Raman Nath regime, where the factor Q defined in equation 1 below, is less than $2\pi$.

$$Q = \frac{2\pi \lambda d}{n \Lambda^2}, Q \leq 2\pi \quad (1)$$

In equation (1) $\lambda$ is the wavelength of the light, d is the thickness of the grating, n is the refractive index of the semiconductor, and $\Lambda$ is the period of the grating. If $Q > 2\pi$, the diffraction must be calculated for a volume grating, and the efficiency increases for beams incident at the Bragg angle of the three dimensional structure. For most semiconductors of interest, n is between 2.5 and 4.5. Since $\Lambda$ will be 10 to 50 vacuum wavelengths in size, the grating performance can usually be approximated as a thin phase grating.

The diffraction characteristics of the induced grating then can be calculated using the Fraunhoffer approximation assuming that the phase shift of the probe beam will be proportional to the spatial pattern of radiation transmitted through the absorption grid or grating. The diffraction pattern at the focal plane of the lens is simply the Fourier transform of the phase grating, where the undiffracted portion of the probe beam is the 0 order peak. The x-ray signal is then separated from the larger undiffracted signal by simply blocking the 0 order peak at the focal plane, as shown in FIG. 2.

For example, with a 15 cm focal length lens and an 88 lines/mm grating with an 890 nm probe beam and a GaAs semiconductor, the zero order beam and the first order diffracted beam will be separated by about 1 cm. The zero order peak will be about 10-50 microns wide, near the diffraction or aberration limit of the lens and the input beam. The diffracted peaks will be much wider depending on the spatial distribution of the x-ray image, around 2 mm wide at the focal plane of the lens for a 100 μm feature. If the radiation illumination is spatially uniform, however, the diffracted peaks will be roughly as narrow as the zero order peaks.

The optical probe wavelength is determined by the choice of semiconductor for which the photorefractive effect is observed. Any direct band gap semiconductor such as GaAs, CdTe, $Cd_{1-y}Zn_yTe$, ZnTe, InP, InGaAsP, ZnSe, ZnO, $TiO_2$, GaP, and others can be used, allowing conversion to optical from 1500 nm to 300 nm. The free carrier photorefractive effect is also observed in indirect band gap materials like Si and Ge, and in nanostructured materials that could potentially be used as well.

The absorption mask is a critical component of this scheme. For 10-30 keV x-rays typical features on the mask would be 5-10 microns in size and 10-30 microns thick. The mask could be produced by femtosecond laser machining or precision micro-machining, UV lithography, or x-ray lithography and electroformed growth. Similar structures have been produced for use as x-ray collimators. Absorption masks for optical radiation are relatively simple to produce using standard photolithographic techniques.

The radiation induced grating is formed on a 100 fs time scale. For a perfect crystal, the carriers will stay in the conduction band for a few nanoseconds at room temperature, but the carrier grating will quickly diffuse spatially as the carriers become spatially homogeneous. The observed diffraction efficiency falls on a time scale of roughly 100 picoseconds, depending on the grating period and the diffusion rate in the semiconductor. The time response of the converter can be improved and controlled by trapping and recombining the free carriers more quickly with proton or neutron irradiated semiconductor crystals. The time response of the semiconductor can be reduced to about 1 picosecond with little loss in sensitivity with neutron, proton, or ion damaged material. The use of damaged crystals is required for the converter to follow the incident radiation flux with picosecond response times.

The conversion efficiency of the optical diffraction caused by the x-ray signal can be calculated in the Fraunhoffer approximation if the size of the x-ray induced phase shift is known. For a double passed square wave phase grating of peak phase shift (lag) Φ, the diffraction efficiency ∈(n) for the n=0, 1, −1, 3, and −3 orders is given by equations 2a-c.

$$\varepsilon(0) = \cos^2(\Phi), \quad (2a)$$

$$\varepsilon(1) = \varepsilon(-1) = \frac{4}{\pi^2}\sin^2(\Phi) \quad (2b)$$

$$\varepsilon(3) = \varepsilon(-3) = \frac{4}{9\pi^2}\sin^2(\Phi) \quad (2c)$$

Even orders have 0 diffraction efficiency for square phase gratings.

Measurements of the x-ray induced refraction effect have only been made for InGaAsP. In InGaAsP, absorption of $10^9$ photons/cm$^2$ of 8 keV x-rays produces about $1.4 \times 10^{-3}$ radians of phase shift for a 1.5 micron wavelength probe beam roughly 100 nm from the band edge. This phase shift is roughly equal to that seen for equivalent numbers of free carriers generated by optical excitation experiments for InGaAsP, and similar to shifts seen in GaAs, CdTe, and ZnTe after the wavelength dependence of the index shift is taken into account.

For high sensitivity, it is desirable to operate the probe beam at a wavelength as close as possible to the band edge. The x-ray induced phase shift is largest near the band edge, and decays relatively slowly as wavelength increases above the band edge. The variation of the induced phase shift for a given probe wavelength as the wavelength approaches the band edge changes approximately as given by equation 3.

$$\Delta\Phi = \frac{AE^2}{E_{gap}^2 - E^2} \quad (3)$$

where A is a constant, E is the energy of the probe laser and $E_{gap}$ is the energy of the band gap of the semiconductor. Absorption just below the band gap due to thermal disorder and structural disorder in the lattice, known as the Urbach absorption, limits how close to the band edge one can tune the probe for a given thickness of substrate material or semiconductor crystal. Reducing the thickness of the crystal is a simple way to reduce optical absorption of the probe beam before the region of x-ray absorption. Lapping, etching, and polishing and/or epitaxial growth procedures can make thin semiconductor layers. For higher energy x-rays, 5-100 micron thick or thicker crystals are desired for high sensitivity.

In principle, this sensitivity could be increased by reducing the temperature of the crystal. Lower temperatures reduce the Urbach absorption significantly, increase the band gap, and increase the peak absorption at the band edge. The reduced Urbach absorption also allows operation even closer to the band edge. The free carrier index variation with temperature can be calculated neglecting excitonic effects in the parabolic band approximation by equation 4, $$\Delta n \propto \frac{1}{kT}\left(\int_0^\infty \frac{x^{1/2}e^{-x}}{x-a}dx\right), \text{ where } a = \frac{\mu(\hbar\omega - E_{gap})}{m_c kT} \quad (4)$$

where Δn=the change in index of refraction, k is Boltzmann's constant, T is the temperature of the semiconductor, μ is the reduced effective mass $$\mu = \frac{m_c m_v}{m_c + m_v},$$

$m_c$ and $m_v$ are the conduction and valance band effective masses, and ħω is the photon energy of the optical beam. The integral in equation 4 increases slowly as a function of a until a reaches about 0.25, where the integral increases more rapidly. Operation at liquid nitrogen temperature could increase the phase shift by a factor of 4 or more over room temperature operation.

The sensitivity for a typical transient grating bulk semiconductor converter operated at room temperature in this simple dark field imaging mode near the band edge can be calculated using published data for room temperature GaAs absorption as an example. Assuming that the phase shift scales as given in equation 3, a probe beam is estimated to operate within 10 nm of the band edge of GaAs for a 20 micron crystal at room temperature. For a 10 photon/$\mu m^2$ absorbed flux of 16 keV photons operated 10-20 nm from the band edge, approximately 0.004 radians peak phase shift is expected. From equation 2a, the diffracted signal at room temperature is calculated as about $2\times10^{-5}$ of the probe beam, equally divided between the 1 and −1 orders. For a symmetric system as shown in FIG. 2, both the +1 and −1 orders would be collected and focused by the optics. This is a small signal, but should be larger than background surface scatter in the solid angle of the diffracted signal, and can be increased by using a reference grating as described below. For small phase amplitude the signal changes roughly quadratically near zero phase. If the detector is operated at liquid nitrogen temperature, the diffracted signal efficiency for the 10 photon/$\mu m^2$ flux would be roughly 16× larger, about $3\times10^{-4}$. A bright tunable pulsed laser probe beam is required to see these small signals on fast time scales. Optical parametric amplified (OPA) lasers are now available that can provide the necessary flux in 100 fs to nanosecond pulse widths, and Ti:Sapphire lasers at 800 nm can be used as near edge probe beams for $Cd_{1-y}Zn_yTe$ with y near 0.2. Sensitivity for optical signals can be calculated similarly using published data for free carrier refraction cross sections. The optical photon flux needed to produce a 0.005 radian shift will be approximately given by the ratio of the x-ray photon energy to the optical photon energy. For 2 eV photons, this would be approximately 7000 photons/$\mu m^2$, or $2\times10^{-7} J/cm^2$. Optical sensitivity can be greatly increased by placing the semiconductor in an etalon, as described below.

Surface scattered probe light will limit the sensitivity of a converter in this high contrast dark field diffraction mode of operation. The detection limit depends on the ratio of the x-ray induced diffraction efficiency per steradian of the probe beam to the background probe scattering fraction in the same solid angle. A narrow solid angle diffracted signal will be tightly focused in the focal plane of the imaging lens, and a tight beam stop in the focal plane at the position of the diffracted beams can then be used to filter out scattered background and improve the detectability of the signal. Filtering the signal at the focal plane in this way will affect the spatial resolution, leading to a tradeoff between sensitivity and spatial resolution. Published measurements of surface scatter from GaAs epitaxial surfaces can be used to estimate the background scatter. A typical example for scattered 900 nm light at 4 degrees in the $10^{-3}$ steradians subtended at the focal plane of the imaging lens needed for imaging with 20 micron resolution in this technique results in estimated scattered backgrounds of about $2\times10^{-6}$ for an image, and $2\times10^{-10}$ for a more tightly Fourier filtered uniform beam. This would limit sensitivity for images with spatial bandwidth to phase shifts of about 0.002 radians, or $5\times10^7$ photons/$cm^2$ at 15 keV at room temperature. The scattering falls off steeply with angle, so the exact grating spacing and probe wavelength would change these estimates. For a uniform x-ray beam that can be efficiently detected with a tighter spatial filter, the sensitivity should increase to x-ray fluxes of $10^7/cm^2$ or smaller. Similar considerations would apply for optical signals.

Figure 3A:
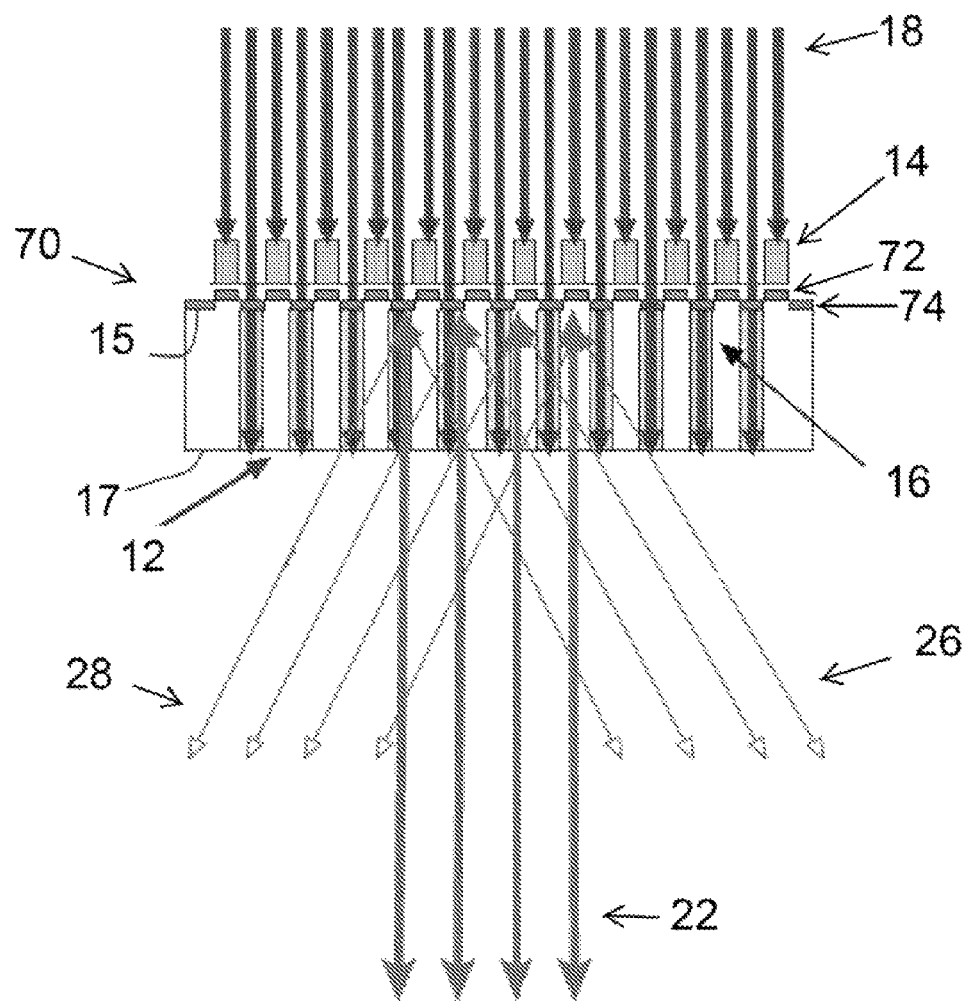
FIG. 3A is a cross-sectional view of a transient grating converter of the invention, having an etched surface relief grating for heterodyne detection.
Figure 3B:
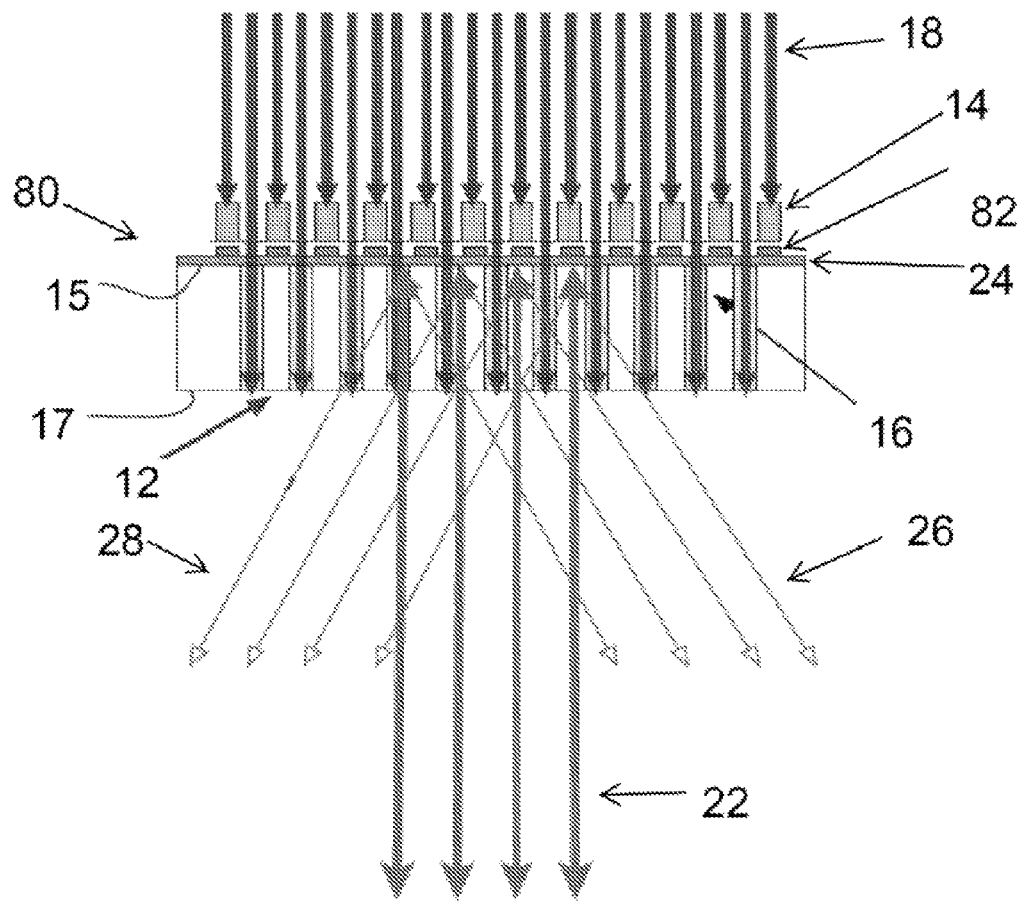
FIG. 3B is a cross-sectional view of a transient grating converter of the invention, having a metallic phase shifting grating for heterodyne detection.

The intensity change of the diffracted signal can be increased a factor of 10-100 times with a controllable decrease in contrast by adding a weak constant amplitude reference grating pattern of the same spatial frequency and phase as the x-ray or optical modulator to the probe beam in the semiconductor. This essentially operates the converter around the small reference phase instead of zero, changing the response of the converter for small signals from quadratic to linear. Light reflected from the reference grating allows effective heterodyne interferometric detection of the weak diffracted probe beam. While the contrast of the signal above the probe background is reduced in this mode, operation with a reference phase can increase the power of the diffracted signal to levels well above scattered backgrounds and increase sensitivity. A small amplitude surface relief grating of a few nm thickness with the same spatial frequency and phase as the x-ray modulation grating can be etched on the wafer as shown in FIG. 3A to give a small diffracted reference background signal. The surface is etched so that the surface is lower where the excitation is present and the probe beam propagates a little further before it hits the mirror in the area where the excitation beam is not present. A small amplitude permanent phase grating can also be formed at the surface of the semiconductor by ion implantation through lithographically formed masks. Ion implantation increases the refractive index of the semiconductor, so since the free carrier index shift is negative, the ion implanted regions must be aligned under the opaque parts of the x-ray or optical absorption grid in FIG. 3A. Another possible method to produce the reference grating on the semiconductor is to use the phase shift from reflection off a metal with a metal grating deposited behind a dielectric mirror on the semiconductor to form a phase grating at the same spatial frequency as the radiation mask at the position of the incident x-ray beam, as shown in FIG. 3B for the case of x-ray excitation. The same method can also be used for optical excitation with an optical absorption grid replacing the x-ray grid in FIGS. 3A, B. The reference grating is used to interferometrically increase the sensitivity of the converter.

Figure 3C:
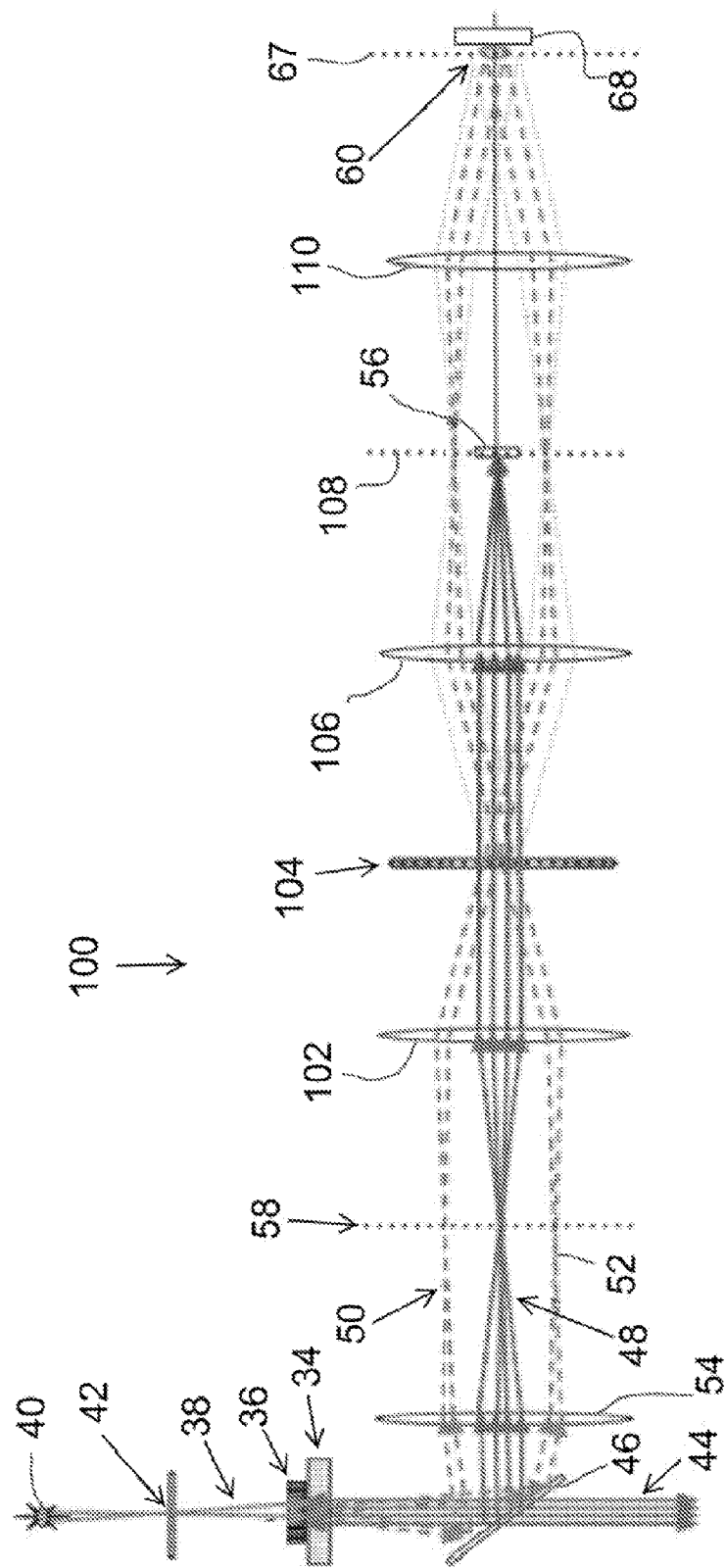
FIG. 3C is a cross-sectional view of a transient grating x-ray to optical imaging system of the invention having a reference grating not on the semiconductor substrate.

It is also possible to use a reference grating that is not built directly on the semiconductor if the probe image is formed by a multiple lens relay system instead of a single lens, as shown in FIG. 3C. A weak transmission grating formed on a glass substrate can be placed at the first image plane of the imaging system and aligned to match the position of the image of the x-ray or optical transmission grid at that plane. If it is properly aligned, it will diffract light from the probe image the same way it would if it was located on the semiconductor. The 0 order diffracted beam is filtered with a beam stop at a subsequent image plane of the relay image system. The weak phase grating can be formed in the glass with minimal surface scattering effects by lithographic masking and ion implantation or on its surface by lithographic masking and etching.

Varying the phase amplitude of the reference grating controls the amplitude of both the diffracted reference wave and the diffracted signal. Variations on the reference diffraction intensity would then be used to detect weak signals. The reference grating generates a reference beam that coherently interferes with and amplifies the diffracted signal light without placing any optical components at a focal plane of the probe beam imaging lens system. Conventional common path interferometric phase imaging systems such as Zernike phase contrast or diffraction phase microscopy would require the presence of an attenuating and/or phase shifting mask at a position where the probe beam is focused to high intensity that would limit the useable probe beam power in the converter and therefore limit its sensitivity.

As shown in FIG. 3A for the case of x-ray excitation, converter 70 is similar to converter 10 of FIG. 1, except that an etched surface relief grating 72 is formed on surface 15 of wafer 12. Surface grating 72 is covered by a mirror 74. In place of etched surface relief grating 72, an ion implanted grating could be formed on the surface 15 of wafer 12. As shown in FIG. 3B, a converter 80 is similar to converter 10 of FIG. 1, except that a metallic phase shift grating (metal grating) 82 is formed on mirror 24 on surface 15 of wafer 12. In both FIGS. 3A, B the remaining components and features are the same as in FIG. 1 and similarly numbered. The operation of the converter is the same for optical excitation with an optical absorption grid replacing the x-ray grid 14 in FIGS. 3A, B.

As shown in FIG. 3C for the case of x-ray excitation, a transient grating x-ray to optical imaging system 100 of the invention having a reference grating not on the semiconductor substrate is similar to system 30 of FIG. 2 through lens 54. However, lens 54 is followed by a more complex three lens arrangement of lenses 102, 106, 110. The 0 order probe beam 48 is not blocked at Fourier Transform plane 58 but is incident on lens 102 along with order probe beams 50, 52. Lens 102 focuses $1^{st}$ order probe beams 50, 52 and collimates 0 order probe beam 48 onto an image plane reference grating 104, which passes the 0 order beam and diffracts the $1^{st}$ order beams onto lens 106. Lens 106 focuses the 0 order beam to a plane 108 where 0 order beam block 56 is located. The diffracted ($1^{st}$ order) beams pass around block 56 and are incident on lens 110, which focuses the diffracted beams to form a diffracted image 60 at image plane 67, where a detector 68 may be placed. The lens system is preferably arranged in the conventional 4f Fourier imaging processing layout, where the lenses are separated by 2 focal lengths and the image and object planes are 1 focal length from their respective lenses, but other configurations can also be used.

For example, with a 0.04 radian reference phase (approximately $10^{-3}$ diffraction efficiency in the sum of the first orders), a 13 photon/$\mu m^2$ x-ray flux producing a 0.005 radian shift at room temperature would result in a 27% change in the probe intensity. The intensity response around this signal would be linear, removing some of the small spatial distortion seen in the direction of the grating due to the quadratic response of the image without a reference beam. Much smaller shifts should be visible for optical detectors with sufficient dynamic range and a sufficiently bright probe beam. One obvious example of this would be a CCD camera used with a short pulse optical probe beam as a short pulse framing camera. Smaller amplitude reference gratings will provide the highest sensitivity at the cost of lower diffraction efficiency. Because it is spatially invariant, the constant reference diffraction signal background created by the presence of the reference grating can be filtered by blocking the spatially invariant part of the diffracted first order probe beam in the focal plane of the imaging system with small circular apodized masks at the positions of the +1 and −1 diffraction spots.

This spatial filtering of the $1^{st}$ order diffracted light would allow only signals with spatial variations in any direction in the plane of the converter to be collected. This would result in some spatial differentiation of the image, but would increase the contrast of the heterodyne optical signal.

Figure 4:
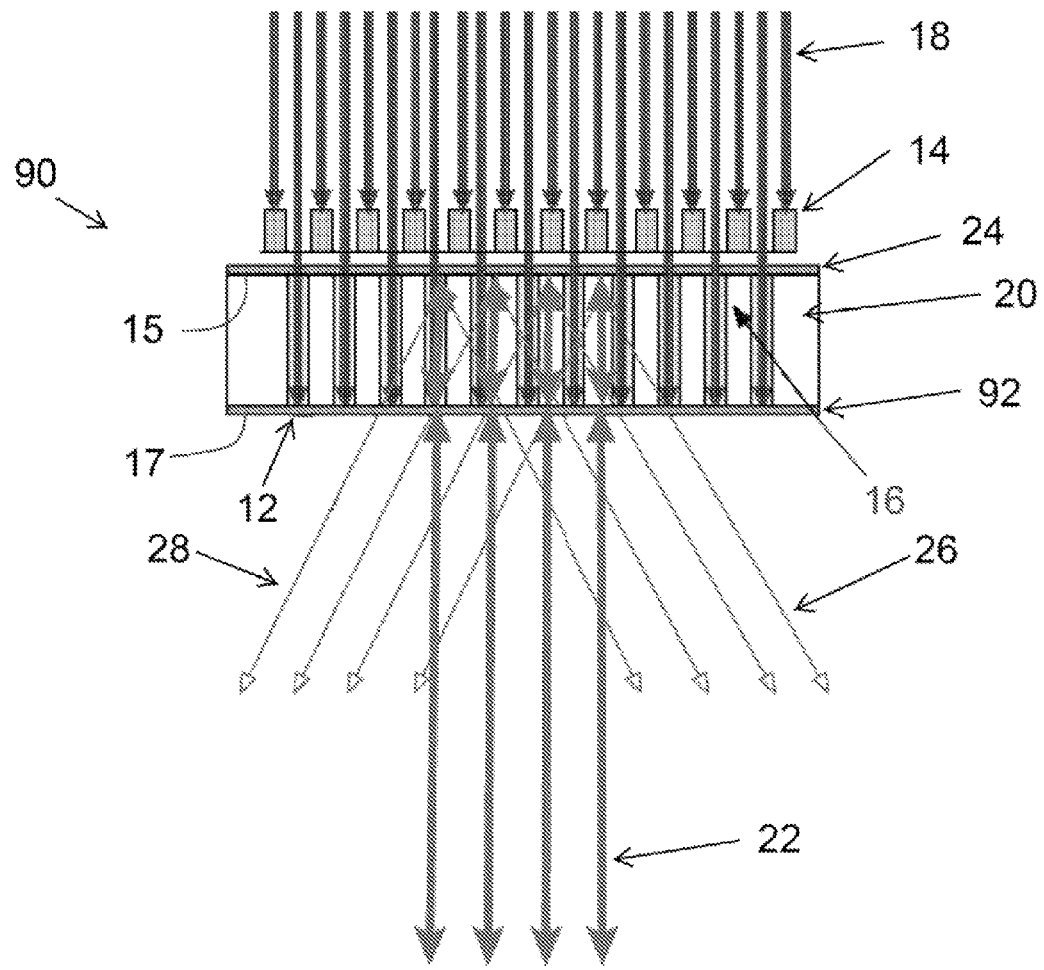
FIG. 4 is a cross-sectional view of a transient grating converter of the invention, having an added front surface mirror to form a Gires-Tournois etalon containing the transient x-ray induced grating.

Somewhat higher sensitivity and diffraction efficiency can be achieved by putting a reflective coating on the input surface on the semiconductor to form an etalon containing the semiconductor slab and the x-ray induced phase grating. Thin etalon structures with distributed Bragg reflector mirrors can be grown epitaxially on crystalline structures. If the back surface mirror has a very high reflectivity near one and the input surface a lower reflectivity, a Gires-Tournois etalon is formed that will amplify the phase shifts caused by the x-ray flux. As shown in FIG. 4, converter 90 is similar to converter 10 of FIG. 1, except that a second mirror 92 is added to surface 17 of wafer 12. Mirror 24 on surface 15 has a reflectivity to probe light of essentially 1, but the reflectivity R of mirror 92 to probe light is less than 1. Because of the 100% reflectivity of the back mirror, the etalon does not change the amplitude of the reflected beam, but the phase of the reflected beam depends strongly on the index of refraction in the etalon and the wavelength of the light. A Fabry Perot etalon can give similar phase effects, but changes the amplitude of the reflected probe beam as well. For the Gires-Tournois etalon, the phase shift Φ of the reflected light is given by equation 5, $$\Phi = 2\tan^{-1}\left(\frac{(1+\sqrt{R})\tan\left(\frac{\phi}{2}\right)}{(1-\sqrt{R})}\right), \text{ where } \phi = \frac{4\pi}{\lambda}nd\cos\theta, \quad (5)$$

where n is the index of refraction, d is the thickness of the semiconductor, θ is the angle of incidence of light in the crystal, R is the reflectivity of the front mirror, and λ is the wavelength of the light.

For small phase shifts around the resonances at φ=m2π, where m=an integer, reflected phase shifts are amplified by $(1+\sqrt{R})/(1-\sqrt{R})$. The diffracted signal and spatial filtering of the converter provides high contrast while the etalon response provides enhanced sensitivity. In contrast, a simple etalon converter with no grating structure must be operated at low throughput to achieve good contrast. Because the light is reflected several times in the etalon before it escapes, absorption from the Urbach tail limits how close to the band edge the detector can be operated more severely than in the case of the non-etalon detector. The phase shift increases monotonically with phase, so the probe beam can have a bandwidth that is a significant fraction of the width of the etalon resonance.

The nonlinear phase response of the etalon will increase the sensitivity at the cost of some loss in time resolution, spatial resolution, and probe bandwidth. In order to maintain good temporal response, the effective finesse of the etalon must be fairly small for a thick semiconductor due to distortion of a reflected light pulse by the etalon. For a 10 μm thick etalon with an index of refraction of 4, the reflectivity of the front mirror in the etalon should be about 45% or lower to reflect a 1 ps pulse without significant distortion. This gives a peak phase shift amplification of 5 for the etalon. Peak amplification can be increased if lower time resolution is acceptable, and must decrease as the thickness of the etalon increases. A reference grating can be included in the etalon for enhanced diffraction efficiency as before. For $1.3 \times 10^9$ 15 keV x-ray photons/$cm^2$ absorbed, the Gires-Tournois etalon enhanced converter with a front reflectivity of 45% should give about a 0.009 radian phase shift at room temperature assuming that the converter is operated at a wavelength detuned from the band edge as in previous x-ray experiments. If the crystal is cooled, a phase shift of 0.036 radians would be expected with about 0.1% conversion efficiency. This is a few times more sensitive than the expected signal for a simple converter tuned close to the band edge.

Thinner detectors with higher etalon finesse can be used for optical signals. Because the etalon can be only one or two microns thick and still absorb the optical signal, a higher finesse etalon can be used to amplify the signal response without sacrificing as much probe bandwidth and time response as in the x-ray example. Optical signals of order 10 nJ/$cm^2$ or less should be detectable with etalon enhanced converters with ps time resolution.

The invention includes a method of converting radiation from an external source to optical radiation, by directing radiation from the external source onto a fixed transmission grating to modulate the radiation. The modulated radiation is passed into a semiconductor substrate to produce a transient induced grating therein. A probe beam is directed into the semiconductor substrate so that it travels twice through the substrate and interacts with the transient grating to diffract a portion of the probe beam. The diffracted portions of the probe beam are imaged. The method may further include the reference grating and/or etalon techniques described above.

It should be possible to construct 1 or 2 ps time resolution x-ray or optical detectors that require no electron optic components with these converters. For example, multiple time frame images can be recorded with multiple ps probes of slightly different wavelengths and polarizations separated optically and recorded on CCD cameras. Since a transform limited pulse of wavelength $\lambda$ and 1.0 ps full width at half maximum pulse width has a bandwidth of about 0.001$\lambda$, the bandwidth of the converter should allow 1 to 3 ps time frames even with etalon enhanced sensitivity. For converters not using etalons, continuous time resolution could be achieved with a frequency chirped probe beam, a spectrograph to resolve the chirped frequencies, and a CCD or other imaging camera. To a first approximation, each frequency would correspond to a point in time on the record. Time resolution in this method depends on the rate of chirp of the probe, so ps time resolution is possible with a properly chirped beam over a range of time limited by the total probe bandwidth and the response of the converter.

In summary, this invention is a transient grating radiation to optical converter and method that is capable of converting x-ray or optical images to coherent infrared or optical images with a temporal response of 1 ps and spatial resolution of 10-20 microns. Good sensitivity to absorbed x-ray and optical fluxes should be possible over a broad range of optical wavelengths for optimized detectors using a combination of probe wavelength tuning, etalon enhancement, heterodyne detection, and cooled crystals. These converters could be used in a variety of ways to record fast bright transient radiation signals.

The sub picosecond rise time and carrier recombination time of the damaged semiconductor allows the converter to follow the temporal variation of the x-ray or optical signal on a 1 picosecond time scale. The converter can be used with appropriately formed broadband or frequency chirped optical pulses to make ultrafast multiframe framing cameras, provide input beams for optical streak cameras, or provide continuous time resolution with frequency chirped probe beams.

The invention may be used for measurement of ultra fast x-ray and optical signals in high radiation environments, measurement of transient optical or x-ray images for inertial confinement fusion (icf), remote measurement of ultra fast x-ray signals, short pulse laser optical and x-ray measurements, and free electron x-ray laser measurements. The invention may be used in ultra fast x-ray to optical converters, picosecond x-ray or optical framing cameras, multiframe x-ray or optical framing cameras, and all optical x-ray or optical streak cameras.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

The invention claimed is:

1. A radiation to optical converter, comprising:
 a semiconductor substrate having first and second opposed surfaces, wherein the semiconductor substrate is formed of a direct band gap semiconductor;
 a first mirror formed on the first surface of the semiconductor substrate;
 a fixed transmission grating positioned adjacent to the first mirror formed on the first surface of the semiconductor substrate; and
 a probe beam source positioned to provide a probe beam that is incident on the second surface of the semiconductor substrate, passes through the semiconductor substrate, and is reflected back therethrough by the first mirror,
 wherein radiation from an external source passing through the fixed transmission grating is thereby modulated, the modulated radiation passing through the first mirror into the semiconductor substrate and producing a transient radiation induced grating therein, and
 wherein a portion of the probe beam passing through the semiconductor substrate is diffracted out of the probe beam by the transient grating.

2. The converter of claim 1, wherein the direct band gap semiconductor is a proton or neutron or ion damaged direct band gap semiconductor.

3. The converter of claim 1, wherein the direct band gap semiconductor is selected from GaAs, CdTe, $Cd_{1-y}Zn_yTe$, ZnTe, InP InGaAsP, ZnSe, ZnO, $TiO_2$, and GaP.

4. The converter of claim 1, wherein the semiconductor substrate has a thickness of about 5-200 microns.

5. The converter of claim 1, wherein the semiconductor substrate ic cooled to liquid nitrogen temperature.

6. The converter of claim 1, wherein the probe beam source is an optical or infrared source.

7. The converter of claim 6, wherein the probe beam source is an optical laser.

8. The converter of claim 1, wherein the probe beam source is tuned just below the band gap of the semiconductor substrate.

9. The converter of claim 1, further comprising a reference optical grating formed on the first surface of the semiconductor substrate and having the same spatial frequency and phase as the fixed grating.

10. The converter of claim 9, wherein the reference optical grating is an etched surface relief grating or ion implanted grating formed on the first surface of the semiconductor substrate, the first mirror being formed on the etched surface relief grating or ion implanted grating.

11. The converter of claim 9, wherein the reference optical grating is a metallic phase shifting grating formed on the first surface of the semiconductor substrate over the first mirror.

12. The converter of claim 1, further comprising a second mirror formed on the second surface of the semiconductor substrate, the second mirror being partly transmissive and partly reflective to the probe beam, thereby forming a Gires-Tournois etalon.

13. The converter of claim 12, wherein the first and second mirrors are dielectric mirrors.

14. The converter of claim 12, further comprising a reference optical grating formed on the first surface of the semiconductor substrate and having the same spatial frequency and phase as the fixed grating.

15. A radiation to optical converter apparatus, comprising:
a radiation to optical converter of claim 1;
external source imaging optics positioned to direct radiation from the external source onto the fixed transmission grating of the converter;
diffracted beam imaging optics positioned to direct the diffracted probe beam to an imaging plane; and
an image detector positioned at the imaging plane.

16. The apparatus of claim 15, wherein the external source is an x-ray source, and the external source imaging optics comprises an x-ray pinhole camera.

17. The apparatus of claim 15, wherein the external source is an optical source, and the external source imaging optics comprises one or more lenses.

18. The apparatus of claim 15, wherein the diffracted beam imaging optics comprises a beam splitter mirror positioned between the probe beam source and the converter to change the direction of the diffracted beam, and at least one lens positioned after the beam splitter mirror to focus an image produced by the diffracted beam onto the imaging plane.

19. The apparatus of claim 18, further comprising a beam block positioned at the Fourier transform plane to block the zero order portion of he diffracted beam.

20. The apparatus of claim 15, wherein the image recoding device comprises a CCD or a photographic plate.

21. The apparatus of claim 15 wherein the converter further comprises a reference optical grating formed on the first surface of the semiconductor substrate and having the same spatial frequency and phase as the fixed grating.

22. The apparatus of claim 15, wherein the converter further comprises a second minor formed on the second surface of the semiconductor substrate, the second mirror being partly transmissive and partly reflective to the probe beam, thereby forming Gires-Tournois etalon.

23. The apparatus of claim 22, wherein the converter further comprises a reference optical grating formed on the first surface of the semiconductor substrate and having the same spatial frequency and phase as the fixed grating.

24. The apparatus of claim 15, wherein the diffracted beam imaging optics further comprises a reference grating.

25. A radiation to optical converter, comprising:
a semiconductor substrate having first and second opposed surfaces, wherein the semiconductor substrate is formed of an indirect band gap semiconductor;
a first mirror formed on the first surface of the semiconductor substrate;
a fixed transmission grating positioned adjacent to the first mirror formed on the first surface of the semiconductor substrate; and
a probe beam source positioned to provide a probe beam that is incident on the second surface of the semiconductor substrate, passes through the semiconductor substrate, and is reflected back therethrough by the first mirror,
wherein radiation from an external source passing through the fixed transmission grating is thereby modulated the modulate radiation passing through the first mirror into the semiconductor substrate and producing a transient radiation induced grating therein, and
wherein a portion of the probe beam passing through the semiconductor substrate is diffracted out of the probe beam by the transient grating.

26. The converter of claim 25, wherein e indirect band gap semiconductor is selected from Si and Ge.

27. A method of converting radiation from an external source to optical radiation, comprising:
directing radiation from the external source onto a fixed transmission grating to modulate the radiation;
passing the modulated radiation into a semiconductor substrate to produce a transient induced grating therein, wherein the semiconductor substrate is formed of a direct band gap semiconductor;
directing a probe beam into the semiconductor substrate so that it travels twice through the semiconductor substrate and interacts with the transient grating to diffract a portion of the probe beam, wherein the probe beam travels twice through the semiconductor substrate b being reflected off a first minor on the substrate; and
imaging diffracted portions of the probe beam.

28. The method of claim 27, further comprising forming the semiconductor substrate of a proton or neutron or ion damaged direct band gap semiconductor.

29. The method of claim 27, further comprising tuning the probe beam to just below the band gap of the semiconductor substrate.

30. The method of claim 27, further comprising providing a reference optical grating on the semiconductor substrate, the reference optical grating having the same spatial frequency and phase as the fixed grating.

31. The method of claim 27, further comprising providing a second minor on the opposed surface of the substrate from the first mirror to form an etalon.

32. The method of claim 31, further comprising providing a reference optical grating on the semiconductor substrate, the reference optical grating having the same spatial frequency and phase as the fixed grating.

* * * * *

UNITED STATES PATENT AND TRADEMARK OFFICE
CERTIFICATE OF CORRECTION

PATENT NO. : 8,879,137 B2  
APPLICATION NO. : 13/423498  
DATED : November 4, 2014  
INVENTOR(S) : Richard E. Stewart et al.

Page 1 of 1

It is certified that error appears in the above-identified patent and that said Letters Patent is hereby corrected as shown below:

On Title page, column one, in Item (75) Inventors, replace the text with the following:

(75) Inventors: Richard E. Stewart, San Ramon, CA (US); Stephen P. Vernon, Pleasanton, CA (US); Paul T. Steele, Livermore, CA (US); Mark E. Lowry, Castro Valley, CA (US)

Signed and Sealed this  
Sixteenth Day of February, 2016

Michelle K. Lee  
*Director of the United States Patent and Trademark Office*